April 8, 1952 G. J. GIBSON ET AL 2,591,926
INERT GAS SHIELDED ARC WELDING METHOD
Filed July 3, 1948
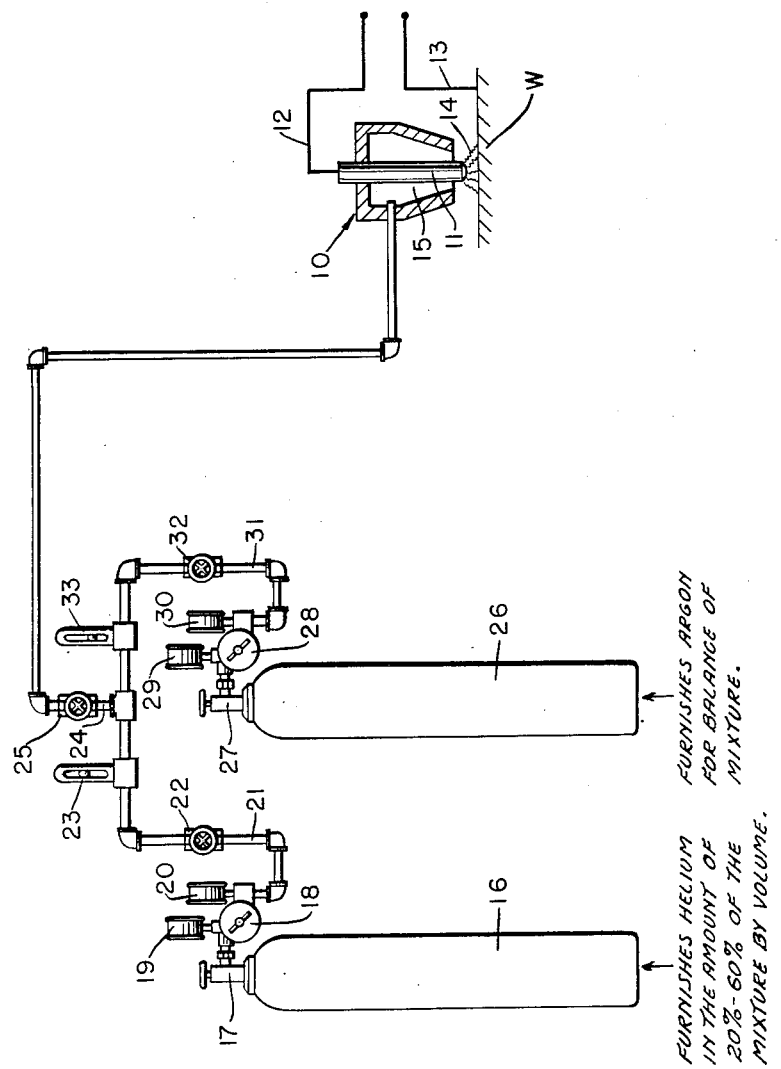
INVENTORS
GILBERT R. ROTHSCHILD
GLENN J. GIBSON
BY
ATTORNEYS Patented Apr. 8, 1952

2,591,926

UNITED STATES PATENT OFFICE 2,591,926

INERT GAS SHIELDED ARC WELDING METHOD

Glenn J. Gibson, Chatham, and Gilbert R. Rothschild, Somerville, N. J., assignors to Air Reduction Company, Incorporated, a corporation of New York Application July 3, 1948, Serial No. 37,037

6 Claims. (Cl. 219—10)

This invention relates to inert gas shielded arc welding.

In this type of welding, an arc is struck between an electrode and the work, and the electrode and the weld are blanketed and shielded by an inert gas to prevent the formation of injurious oxides and nitrides in the weld metal. The electrode is usually of the non-consuming type, such as a tungsten electrode or a carbon electrode, and the inert gas is usually projected against the work from the electrode holder in the form of a stream that surrounds the tip of the electrode, the arc, and the weld puddle.

The gases that have been used with the most success for the gas shield are helium and argon. Since each of these gases is completely inert, it might be assumed that the same results would be obtained when using one of them for the gas shield as when using the other, but it has been found that this is not the case. When using helium as the shielding gas, greater weld penetration and hence greater welding speed can be obtained for any given welding current. However, helium has a tendency to make the arc unstable. Moreover, helium is not altogether suitable for use by itself for the shielding gas when welding aluminum because of its tendency to darken the weld or cause it to turn out dull and gray and have a porous character.

Argon has a pronounced cleansing action at the surface of the weld puddle and is therefore better adapted for use as the shielding gas when welding aluminum because it causes the finished weld to turn out bright, shiny, and non-porous. For most metals it has a decided stabilizing influence on the arc. The principal objection to its use is the small weld penetration obtained for any given welding current as compared with that obtained with helium.

For the above reasons, it has heretofore been the practice to use argon as the shielding gas when welding aluminum and to use either argon or helium when welding other metals.

We have discovered that when welding aluminum, if a mixture of helium and argon is used for the shielding gas in the proper proportions, results can be obtained that are not obtainable when either gas is used alone. We have also found this to be true in the welding of certain other metals such as stainless steel and similar alloy steels.

The principal object of the invention, therefore, is to provide an improved way of arc welding aluminum by the inert gas shielded method, and a further object is to provide an improved way of welding other metals such as stainless steel and the like by this method.

According to the invention, when welding aluminum, a shielding gas mixture is employed containing enough argon to produce a cleansing action on the weld puddle and to produce a bright, shiny, and non-porous weld. As much helium as possible is included in the mixture to increase weld penetration and the welding speed without sacrificing to too great an extent the beneficial results obtained by the use of the argon. We have found that if the mixture contains 80% argon and 20% helium by volume, a very satisfactory aluminum weld is obtained which is non-porous and has a good shiny appearance, and sufficient penetration will be obtained for some operations. Also, this amount of argon will result in good arc stability. The more helium there is in the mixture, the better will be the penetration, and we have ascertained that the content of helium can be increased up to 60% for this purpose without materially sacrificing the good quality of the weld and its appearance, but beyond this amount of helium the weld becomes porous and turns out dull and gray and the arc becomes unstable. The permissible range of the helium content is therefore from 20% to 60% by volume, the balance in any case being argon. The best compromise in the desirable results has been obtained when the helium constitutes anywhere from 40% to 50% of the mixture, and therefore this is the preferred range for the helium content.

When welding stainless steel and similar alloy steels helium has heretofore usually been used for the shielding gas, but we have found that it is desirable to use along with the helium an amount of argon which will improve arc stability without causing too much loss in weld penetration and welding speed. It has been ascertained that if a mixture of helium and argon is used for the shielding gas the helium content can be reduced to 60% and used with 40% of argon to obtain good arc stability, or even reduced as low as 20% and used with 80% of argon to obtain even better arc stability, without the reduction in weld penetration becoming a serious factor. While the tendency of the helium to produce a weld that is dull and lacks a bright shiny appearance is not so objectionable when welding stainless steel and similar alloy steels as when welding aluminum, nevertheless, the argon that is used in the mixture primarily for the purpose of obtaining better arc stability does result in a weld having a brighter appearance than when an all-helium shielding gas is employed and assures a non-porous weld. The permissible range of the helium content of the shielding gas mixture when welding stainless steel and similar alloy steels in accordance with the invention is therefore the same as when welding aluminum, namely, from 20% to 60% by volume, the balance in any case being argon.

Actual use of a shielding gas containing helium and argon in the above stated proportions has shown that aluminum welding operations can be speeded up considerably due to the presence of helium in the mixture and yet the bright, shiny, and non-porous character of the weld is retained, and also a more stable arc is obtained, especially with A.-C. welding. Also, when welding stainless steel and similar alloy steels, it has been found that a satisfactory welding speed can be maintained, while the presence of the argon renders the arc more stable, especially when welding with alternating current, and tends to give the weld a good appearance and eliminate porosity. These are results which are not obtainable by using for the shielding gas either helium or argon alone.

Any suitable apparatus may be employed for arc welding metals in accordance with the invention. The single figure of the accompanying drawing diagrammatically illustrates one type of apparatus which may be used.

Referring to the drawing, 10 represents an electrode holder supporting an electrode 11. The electrode is preferably a non-consuming electrode made of tungsten. The electrode and the work-piece W are electrically connected to a source of welding current, such as a generator or transformer, by means of the conductors 12 and 13. Thus when welding current is supplied, an arc 14 may be maintained between the tip of the electrode and the work-piece to effect the desired welding operation. The electrode holder has a gas chamber 15 from which the shielding gas is adapted to be projected against the work-piece in the form of a stream surrounding the tip of the electrode, the arc 14, and the weld puddle.

A cylinder or other container 16 containing compressed helium, is provided with a valve 17 and a pressure regulator 18 so that the helium may be released at the desired pressure. Pressure gauges 19 and 20 indicate the pressure of the helium within the cylinder and its pressure after it passes through the pressure regulator 18. The helium is delivered through a pipe 21, controlled by a valve 22, to a flowmeter 23, and thence to the pipe 24, controlled by a valve 25, which delivers the helium to the gas chamber 15.

Another cylinder or container 26 contains compressed argon. A valve 27 controls the discharge of argon from the cylinder. The argon passes through a pressure regulator 28, and pressure gauges 29 and 30 indicate the pressure of the argon within the cylinder and its pressure after it passes through the pressure regulator. The argon is delivered through a pipe 31, controlled by a valve 32, to a flowmeter 33, and thence to the above-mentioned pipe 24 which leads to the gas chamber 15.

By the means above described, a mixture of helium and argon in the proportions above specified can be delivered to the gas chamber 15 to provide the gas shield.

We claim:

1. In an arc welding method the improvement which comprises blanketing the arc with a homogeneous mixture of helium and argon in which from 20% to 60% of the mixture by volume is helium and the balance is argon.

2. In an arc welding method the improvement which comprises blanketing the arc with a homogeneous mixture of helium and argon in which from 40% to 50% of the mixture by volume is helium and the balance is argon.

3. In the method of arc welding aluminum the improvement which comprises delivering to the region of the arc to form a protective gaseous shield, a homogeneous mixture of helium and argon in which from 20% to 60% of the mixture by volume is helium and the balance is argon.

4. In the method of arc welding aluminum the improvement which comprises delivering to the region of the arc to form a protective gaseous shield, a homogeneous mixture of helium and argon in which from 40% to 50% of the mixture by volume is helium and the balance is argon.

5. An arc welding method which comprises striking an arc between a non-consuming electrode and a metallic work-piece, and delivering to the region of the arc to form a protective gaseous shield for the tip of the electrode, the arc, and the weld puddle, a homogeneous mixture of helium and argon in which from 20% to 60% of the mixture by volume is helium and the balance is argon.

6. The method of welding aluminum which comprises striking an arc between a non-consuming electrode and the aluminum work-piece, and delivering to the region of the arc to form a protective gaseous shield for the tip of the electrode, the arc, and the weld puddle, a homogeneous mixture of helium and argon in which from 20% to 60% of the mixture by volume is helium and the balance is argon.

GLENN J. GIBSON.
GILBERT R. ROTHSCHILD.

REFERENCES CITED

The following references are of record in the file of this patent:

UNITED STATES PATENTS

| Number | Name | Date |
|---|---|---|
| 2,053,417 | Brace | Sept. 8, 1936 |
| 2,522,482 | Olzak | Sept. 12, 1950 |

OTHER REFERENCES

General Electric Review, July 1944, pages 21–26, particularly pages 21 and 22.